US012531157B2

(12) United States Patent
Wen et al.

(10) Patent No.: US 12,531,157 B2
(45) Date of Patent: Jan. 20, 2026

(54) ARTIFICIAL INTELLIGENCE (AI) MULTI-AGENT FRAMEWORK

(71) Applicant: International Business Machines Corporation, Armonk, NY (US)

(72) Inventors: Bo Wen, Chappaqua, NY (US); Chen Wang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 18/602,222

(22) Filed: Mar. 12, 2024

(65) Prior Publication Data

US 2025/0292900 A1    Sep. 18, 2025

(51) Int. Cl.
*G16H 50/20* (2018.01)
*G06F 40/20* (2020.01)
*G16H 10/20* (2018.01)

(52) U.S. Cl.
CPC .............. *G16H 50/20* (2018.01); *G06F 40/20* (2020.01); *G16H 10/20* (2018.01)

(58) Field of Classification Search
CPC ......... G16H 50/20; G16H 10/20; G06F 40/20
See application file for complete search history.

(56) References Cited

U.S. PATENT DOCUMENTS

| | | | | |
|---|---|---|---|---|
| 2014/0297316 A1* | 10/2014 | Noordvyk | ............... | G16H 10/20 705/3 |
| 2019/0272323 A1* | 9/2019 | Galitsky | ................ | G06F 40/253 |
| 2020/0272919 A1* | 8/2020 | Haimson | ................ | G16H 50/20 |
| 2020/0294677 A1* | 9/2020 | Godinho | ................ | G16H 50/50 |

(Continued)

FOREIGN PATENT DOCUMENTS

| | | |
|---|---|---|
| CN | 114372143 A | 4/2022 |
| CN | 116595131 A | 8/2023 |

(Continued)

OTHER PUBLICATIONS

F. H. Wang, "A Feasible Study of a Deep Learning Model Supporting Human-Machine Collaborative Learning of Object-Oriented Programming," in IEEE Transactions on Learning Technologies, vol. 17, pp. 413-427, 2024, doi: 10.1109/TLT.2022.3226345. (Year: 2022).*

(Continued)

*Primary Examiner* — Sun M Li
(74) *Attorney, Agent, or Firm* — Harrity & Harrity, LLP

(57) ABSTRACT

According an embodiment of the present invention, a system processes requests to perform projects. The system comprises one or more memories, and at least one processor coupled to the one or more memories. The at least one processor processes a request in a natural language to perform a project via a hierarchy of machine learning agents. One or more machine learning agents of a management layer of the hierarchy determine and assign tasks for the project to one or more machine learning agents of an operation layer of the hierarchy based on the request. The at least one processor performs the assigned tasks by the one or more machine learning agents of the operation layer to perform the project. Embodiments of the present invention further include a method and computer program product for processing requests to perform projects in substantially the same manner described above.

24 Claims, 8 Drawing Sheets

(56) References Cited

U.S. PATENT DOCUMENTS

| | | | | |
|---|---|---|---|---|
| 2021/0125124 | A1* | 4/2021 | Meharwade | G06N 20/00 |
| 2021/0334462 | A1* | 10/2021 | Kukreja | G06F 40/295 |
| 2022/0019935 | A1* | 1/2022 | Ghatage | G06N 20/20 |
| 2022/0391591 | A1* | 12/2022 | Ronen | G06F 16/345 |
| 2023/0045696 | A1* | 2/2023 | Griffin | G06N 20/00 |
| 2023/0104655 | A1* | 4/2023 | Amarasingham | G16H 15/00 705/2 |
| 2025/0068668 | A1* | 2/2025 | Grbic | G16H 30/40 |

FOREIGN PATENT DOCUMENTS

| | | | | |
|---|---|---|---|---|
| CN | 116610819 | A | 8/2023 | |
| CN | 116631562 | A | 8/2023 | |
| CN | 116775911 | A | 9/2023 | |
| CN | 116913450 | A | 10/2023 | |
| CN | 116993421 | A | 11/2023 | |
| WO | WO-2023114031 | A1 * | 6/2023 | G16H 20/60 |
| WO | 2023/225504 | A1 | 11/2023 | |

OTHER PUBLICATIONS

D. Kamat, P. Arora, L. P. Bhan and S. Siddappa, "Intelligent and Adaptive Multi-Tiered Taxonomy for Digital Workplace Request Fulfilment Automations and Remediations," 2023 IEEE Intl Conf on Cloud Computing in Emerging Markets (CCEM), Mysuru, India, 2023, pp. 191-201, doi: 10.1109/CCEM60455.2023.00038 (Year: 2023).*

Suppadungsuk S, Thongprayoon C, Miao J, Krisanapan P, Qureshi F, Kashani K, Cheungpasitporn W. Exploring the Potential of Chatbots in Critical Care Nephrology. Medicines (Basel). Oct. 2, 20230; 10(10):58. doi: 10.3390/medicines10100058. PMID: 37887265; PMCID: PMC10608511. (Year: 2023).*

Nosrati H, Nosrati M. Artificial Intelligence in Regenerative Medicine: Applications and Implications. Biomimetics (Basel). Sep. 20, 2023;8(5):442. doi: 10.3390/biomimetics8050442. PMID: 37754193; PMCID: PMC10526210. (Year: 2023).*

Sougata Chakraborty, et al., "Medical Application Using Multi Agent System—A Literature Survey", Int. Journal of Engineering Research and Applications, ISSN : 2248-9622, vol. 4, Issue 2( Version 1), Feb. 2014, pp. 528-546, 19 pages.

Elhadi Shakshuki, et al., "Multi-Agent System Applications in Healthcare: Current Technology and Future Roadmap" Procedia Computer Science 52 (2015): 252-261, The 6th International Conference on Ambient Systems, Networks and Technologies (ANT 2015), 10 pages.

* cited by examiner

ARTIFICIAL INTELLIGENCE (AI) MULTI-AGENT FRAMEWORK

BACKGROUND

1. Technical Field

Present invention embodiments relate to artificial intelligence (AI) or machine learning (ML), and more specifically, to an artificial intelligence (AI) framework utilizing a hierarchy of large language model (LLM) agents to optimize various tasks (e.g., patient-provider communication within the healthcare sector, insurance-customer communication, mental health provider-patient communication, provider-patient family member communication, etc.).

2. Discussion of the Related Art

Patients fill out traditional medical questionnaires for a health assessment. However, the data collected from this process can be unreliable and inconsistent due to various factors, such as environmental influences, recall biases, literacy barriers, and misunderstandings. Developing these questionnaires is also challenging because it relies on experience and intuition, which can result in missing important scenarios and situations that patients may experience. Further, multiple-choice questions may limit patients' ability to express themselves and overlook essential factors.

Although chatbots have been used in healthcare related scenarios, their use is for providing medical information for patients. This use of chatbots is misplaced since patients cannot judge when the chatbots (or artificial intelligence (AI)) make mistakes, thereby providing an inefficient process that may lead to injury to a patient.

In addition, existing Internet of Things (IoT) and wearable devices may be used for health related scenarios. However, these devices are narrowly focused, and can only measure specific signals or targeted diseases. Challenges, such as limited battery life, low user compliance, and lack of interoperability, hinder their adoption.

SUMMARY

According to one embodiment of the present invention, a system processes requests to perform projects. The system comprises one or more memories, and at least one processor coupled to the one or more memories. The at least one processor processes a request in a natural language to perform a project via a hierarchy of machine learning agents. One or more machine learning agents of a management layer of the hierarchy determine and assign tasks for the project to one or more machine learning agents of an operation layer of the hierarchy based on the request. The at least one processor performs the assigned tasks by the one or more machine learning agents of the operation layer to perform the project. Embodiments of the present invention further include a method and computer program product for processing requests to perform projects in substantially the same manner described above.

BRIEF DESCRIPTION OF THE DRAWINGS

Generally, like reference numerals in the various figures are utilized to designate like components.

DETAILED DESCRIPTION

Figure 1:
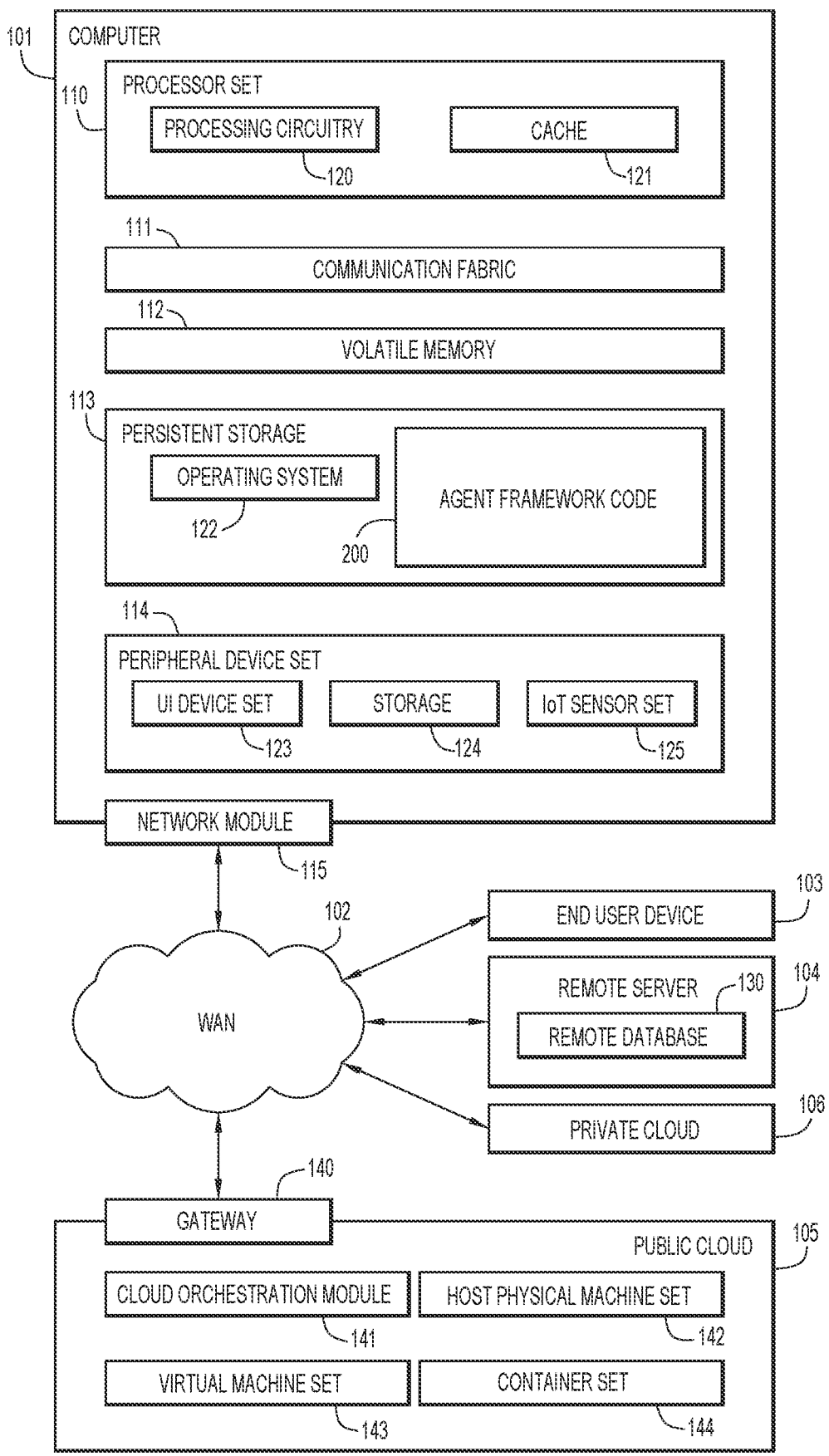
FIG. 1 is a diagrammatic illustration of an example computing environment according to an embodiment of the present invention.

Chatbots have been used in healthcare related scenarios to provide medical information for patients. However, the use of chatbots in this context has been misplaced since patients cannot judge when the chatbots (or artificial intelligence (AI)) make mistakes. This provides an inefficient process that may lead to injury to a patient.

According to an aspect of the invention, there is provided a method of processing requests to perform projects. The method processes a request in a natural language to perform a project via a hierarchy of machine learning agents of at least one processor. One or more machine learning agents of a management layer of the hierarchy determine and assign tasks for the project to one or more machine learning agents of an operation layer of the hierarchy based on the request. The assigned tasks are performed by the one or more machine learning agents of the operation layer to perform the project.

This aspect optimizes, for example, patient-provider communication within the healthcare sector, addresses the issue of information asymmetry between patients and healthcare professionals, and aims to deliver quality care more efficiently across all groups. The hierarchy of machine learning agents enables users to converse naturally using their own words and native language to report symptoms, concerns, and other matters.

In embodiments, the method further monitors operation of the machine learning agents of the operation layer by one or more machine learning agents of an administration layer of the hierarchy, and adjusts behavior of the machine learning agents of the operation layer by the one or more machine learning agents of the administration layer in response to one or more from a group of deficient performance and non-compliance with guidelines. A present invention embodiment provides a self-evolving mechanism to enhance system performance continuously and iteratively based on encountered events and interactions. The self-evolving mechanism monitors the performance of the machine learning agents and detects misalignments in order to update and improve the behaviors of the machine learning agents.

In embodiments, the machine learning agents of the administration, management, and operation layers include large language models and the monitoring is based on natural language reports. The hierarchy of large language models (LLMs) enables users to converse naturally using their own words and native language to report symptoms, concerns, and other matters. Further, the reports are in natural language (NL) (instead of a numerical score (e.g., 1-5, etc.)) to provide greater resolution for indicating system operation and behavior.

In embodiments, the method adjusts prompts for the large language models of the operation layer. This provides a self-evolving mechanism to enhance system performance continuously and iteratively based on encountered events and interactions by adjusting behaviors of the large language models.

In embodiments, the machine learning agents of the administration layer include large-sized large language models, the machine learning agents of the management layer include medium-sized large language models, and the machine learning agents of the operation layer include small-sized large language models. The large language models (LLMs) enables users to converse naturally using their own words and native language to report symptoms, concerns, and other matters. Further, using different sized LLMs provides the possibility to optimize computing power utilization corresponding to the tasks of the associated layers, thereby distributing tasks in a manner that provides optimal performance (e.g., layers do not have excessive unused computing power or require additional computing power to perform tasks, etc.).

In embodiments, the method further monitors operation of the machine learning agents of the operation layer by one or more machine learning agents of an administration layer of the hierarchy, and adjusts behavior of the machine learning agents of the administration and/or operation layers by the one or more machine learning agents of the administration layer to reduce one or more from a group of non-compliance incidents and training iterations. This provides a self-evolving mechanism to enhance system performance continuously and iteratively based on encountered events and interactions. The self-evolving mechanism monitors the performance of the machine learning agents and detects misalignments, and updates behaviors of the machine learning agents for improved compliance and reduced training sessions.

In embodiments, the method further interacts with health care providers in the natural language, via at least one machine learning agent of the management layer, to receive the request, and interacts with patients in the natural language to obtain information and translates the information obtained from the patients into a medical questionnaire to perform the project via at least one machine learning agent of the operation layer. This optimizes patient-provider communication within the healthcare sector, addresses the issue of information asymmetry between patients and healthcare professionals, and aims to deliver quality care more efficiently across all groups.

In embodiments, the patients interact with the at least one machine learning agent of the operation layer via one or more from a group of phone, text messages, smart devices, email, and social media platforms. This enables a present invention embodiment to cater to various user preferences without placing additional burden on a healthcare teams' adaptability, and enables communication to happen at any time or location convenient for the user.

According to an aspect of the invention, there is provided a system for processing requests to perform projects. The system comprises one or more memories and at least one processor coupled to the one or more memories. The at least one processor processes a request in a natural language to perform a project via a hierarchy of machine learning agents. One or more machine learning agents of a management layer of the hierarchy determine and assign tasks for the project to one or more machine learning agents of an operation layer of the hierarchy based on the request. The at least one processor performs the assigned tasks by the one or more machine learning agents of the operation layer to perform the project.

This aspect optimizes, for example, patient-provider communication within the healthcare sector, addresses the issue of information asymmetry between patients and healthcare professionals, and aims to deliver quality care more efficiently across all groups. The hierarchy of machine learning agents enables users to converse naturally using their own words and native language to report symptoms, concerns, and other matters.

In embodiments of the system, the at least one processor further monitors operation of the machine learning agents of the operation layer by one or more machine learning agents of an administration layer of the hierarchy, and adjusts behavior of the machine learning agents of the operation layer by the one or more machine learning agents of the administration layer in response to one or more from a group of deficient performance and non-compliance with guidelines. A present invention embodiment provides a self-evolving mechanism to enhance system performance continuously and iteratively based on encountered events and interactions. The self-evolving mechanism monitors the performance of the machine learning agents and detects misalignments in order to update and improve the behaviors of the machine learning agents.

In embodiments of the system, the machine learning agents of the administration, management, and operation layers include large language models and the monitoring is based on natural language reports. The hierarchy of large language models (LLMs) enables users to converse naturally using their own words and native language to report symptoms, concerns, and other matters. Further, the reports are in natural language (NL) (instead of a numerical score (e.g., 1-5, etc.)) to provide greater resolution for indicating system operation and behavior.

In embodiments of the system, the at least one processor adjusts prompts for the large language models of the operation layer. This provides a self-evolving mechanism to enhance system performance continuously and iteratively based on encountered events and interactions by adjusting behaviors of the large language models.

In embodiments of the system, the machine learning agents of the administration layer include large-sized large language models, the machine learning agents of the management layer include medium-sized large language models, and the machine learning agents of the operation layer include small-sized large language models. The hierarchy of large language models (LLMs) enables users to converse naturally using their own words and native language to report symptoms, concerns, and other matters. Further, the different sized LLMs provide computing power corresponding to the tasks of the associated layers, thereby distributing tasks in a manner that provides optimal performance (e.g., layers do not have excessive unused computing power or require additional computing power to perform tasks, etc.).

In embodiments of the system, the at least one processor further monitors operation of the machine learning agents of the operation layer by one or more machine learning agents of an administration layer of the hierarchy, and adjusts behavior of the machine learning agents of the administration and/or operation layers by the one or more machine learning agents of the administration layer to reduce one or more from a group of non-compliance incidents and training iterations. This provides a self-evolving mechanism to enhance system performance continuously and iteratively based on encountered events and interactions. The self-evolving mechanism monitors the performance of the machine learning agents and detects misalignments, and updates behaviors of the machine learning agents for improved compliance and reduced training sessions.

In embodiments of the system, the at least one processor further interacts with health care providers in the natural language, via at least one machine learning agent of the management layer, to receive the request, and interacts with patients in the natural language to obtain information and translates the information obtained from the patients into a medical questionnaire to perform the project via at least one machine learning agent of the operation layer. This optimizes patient-provider communication within the healthcare sector, addresses the issue of information asymmetry between patients and healthcare professionals, and aims to deliver quality care more efficiently across all groups.

In embodiments of the system, the patients interact with the at least one machine learning agent of the operation layer via one or more from a group of phone, text messages, smart devices, email, and social media platforms. This enables a present invention embodiment to cater to various user preferences without placing additional burden on a healthcare teams' adaptability, and enables communication to happen at any time or location convenient for the user.

According to an aspect of the invention, there is provided a computer program product for processing requests to perform projects. The computer program product comprises one or more computer readable storage media having program instructions collectively stored on the one or more computer readable storage media. The program instructions are executable by at least one processor to cause the at least one processor to process a request in a natural language to perform a project via a hierarchy of machine learning agents. One or more machine learning agents of a management layer of the hierarchy determine and assign tasks for the project to one or more machine learning agents of an operation layer of the hierarchy based on the request. The at least one processor performs the assigned tasks by the one or more machine learning agents of the operation layer to perform the project.

This aspect optimizes, for example, patient-provider communication within the healthcare sector, addresses the issue of information asymmetry between patients and healthcare professionals, and aims to deliver quality care more efficiently across all groups. The hierarchy of machine learning agents enables users to converse naturally using their own words and native language to report symptoms, concerns, and other matters.

In embodiments of the computer program product, the program instructions further cause the at least one processor to monitor operation of the machine learning agents of the operation layer by one or more machine learning agents of an administration layer of the hierarchy, and adjust behavior of the machine learning agents of the operation layer by the one or more machine learning agents of the administration layer in response to one or more from a group of deficient performance and non-compliance with guidelines. A present invention embodiment provides a self-evolving mechanism to enhance system performance continuously and iteratively based on encountered events and interactions. The self-evolving mechanism monitors the performance of the machine learning agents and detects misalignments in order to update and improve the behaviors of the machine learning agents.

In embodiments of the computer program product, the machine learning agents of the administration, management, and operation layers include large language models and the monitoring is based on natural language reports. The hierarchy of large language models (LLMs) enables users to converse naturally using their own words and native language to report symptoms, concerns, and other matters. Further, the reports are in natural language (NL) (instead of a numerical score (e.g., 1-5, etc.)) to provide greater resolution for indicating system operation and behavior.

In embodiments of the computer program product, the program instructions further cause the at least one processor to adjust prompts for the large language models of the operation layer. This provides a self-evolving mechanism to enhance system performance continuously and iteratively based on encountered events and interactions by adjusting behaviors of the large language models.

In embodiments of the computer program product, the machine learning agents of the administration layer include large-sized large language models, the machine learning agents of the management layer include medium-sized large language models, and the machine learning agents of the operation layer include small-sized large language models. The hierarchy of large language models (LLMs) enables users to converse naturally using their own words and native language to report symptoms, concerns, and other matters. Further, the different sized LLMs provide computing power corresponding to the tasks of the associated layers, thereby distributing tasks in a manner that provides optimal performance (e.g., layers do not have excessive unused computing power or require additional computing power to perform tasks, etc.).

In embodiments of the computer program product, the program instructions further cause the at least one processor to monitor operation of the machine learning agents of the operation layer by one or more machine learning agents of an administration layer of the hierarchy, and adjust behavior of the machine learning agents of the administration and/or operation layers by the one or more machine learning agents of the administration layer to reduce one or more from a group of non-compliance incidents and training iterations. This provides a self-evolving mechanism to enhance system performance continuously and iteratively based on encountered events and interactions. The self-evolving mechanism monitors the performance of the machine learning agents and detects misalignments, and updates behaviors of the machine learning agents for improved compliance and reduced training sessions.

In embodiments of the computer program product, the program instructions further cause the at least one processor to interact with health care providers in the natural language, via at least one machine learning agent of the management layer, to receive the request, and interact with patients in the natural language to obtain information and translate the information obtained from the patients into a medical questionnaire to perform the project via at least one machine learning agent of the operation layer. This optimizes patient-provider communication within the healthcare sector, addresses the issue of information asymmetry between patients and healthcare professionals, and aims to deliver quality care more efficiently across all groups.

In embodiments of the computer program product, the patients interact with the at least one machine learning agent of the operation layer via one or more from a group of phone, text messages, smart devices, email, and social media platforms. This enables a present invention embodiment to cater to various user preferences without placing additional burden on a healthcare teams' adaptability, and enables communication to happen at any time or location convenient for the user.

By way of example, an embodiment of the present invention may be used to optimize patient-provider communication within the healthcare sector. The present invention embodiment addresses the issue of information asymmetry between patients and healthcare professionals and aims to deliver quality care more efficiently across all groups. The present invention embodiment employs a hierarchy of large language models (LLMs) that enables patients to converse naturally using their own words and native language to report symptoms and concerns, which the present invention embodiment translates into a standardized medical questionnaire format for healthcare providers. However, present invention embodiments may translate the native language into formats (e.g., templates, documents, questionnaires, forms, etc.) for various scenarios (e.g., health care provider-patient communication, insurance-customer communication, mental health provider-patient communication, provider-patient family member communication, etc.).

An embodiment of the present invention uses an artificial intelligence (AI) framework or system (providing chatbots or assistants) to collect data from patients. This addresses fundamental information asymmetry in a patient-provider relationship, as each provider handles multiple patients. The providers are motivated to spend less time on each patient to improve efficiency, but patients are encouraged to occupy more time from the providers to get better care. The present invention embodiment resolves this intrinsic conflict. In other words, patients can spend as much time as they like to share their concerns, symptoms, and expectations with the chatbot that shows empathy and patience.

The present invention embodiment provides an artificial intelligence (AI) framework or system that accurately and reliably summarizes a conversation into a concise summary for a care team and provides reference and reasoning. Hence, the information is auditable and explainable. For example, when patients fill out traditional medical questionnaires, the data collected can be unreliable and inconsistent due to various factors, such as environmental influences, recall biases, literacy barriers, and misunderstandings. Developing these questionnaires is also challenging because it relies on experience and intuition, which can result in missing important scenarios and situations that patients may experience. Multiple-choice questions may limit patients' ability to express themselves and overlook essential factors.

Accordingly, a present invention embodiment employs large language models (LLMs) to convert medical queries into casual conversations, making it easier for patients to share information while reducing anxiety. The LLMs can also process large amounts of textual information at the population level, allowing for continuous optimization and personalization of questions for each patient. From the care team's perspective, the LLMs can extract clinically relevant insights from these informal conversations, ensuring an efficient information collection process.

Further, existing Internet of Things (IoT) and wearable devices are narrowly focused, and can only measure specific signals or targeted diseases. Challenges, such as limited battery life, low user compliance, and lack of interoperability hinder their adoption. Since a majority of the U.S population owns cellphones, potential outreach and affordability of a present invention embodiment provide advantages over niche-focused IoT/wearable devices. The present invention embodiment enables access to care regardless of their health, income, or location. Additionally, the chatbot or assistant of the present invention embodiment seamlessly fetches necessary health readings upon request for those equipped with smart devices. Moreover, the present invention embodiment provides patients with diverse communication options ranging from phones and emails to social media, thereby ensuring adaptability to patient preferences. In addition, physicians interact with a uniform interface regardless of the patient's chosen medium, substantially reducing the care team's learning curve.

An embodiment of the present invention provides an omnichannel artificial intelligence (AI) assistant utilizing a hierarchy of large language model (LLM) agents to optimize patient-provider communication within the healthcare sector. The AI assistant addresses the issue of information asymmetry between patients and healthcare professionals and aims to deliver quality care more efficiently across all groups. The AI assistant enables patients to converse naturally using their own words and native language to report symptoms and concerns, which the system translates into a standardized medical questionnaire format. A chatbot of the AI assistant uses advanced natural language processing (NLP) to analyze patient input, ensuring accuracy and relevance. This approach eliminates common issues associated with traditional medical surveys, such as misunderstanding, recall bias, and limited self-expression.

An embodiment of the present invention provides a plural tier multi-agent network framework that segregates processing functions and scales complexity according to task importance and frequency. The tiers include leader agents with large LLMs for auditing and strategic oversight, manager agents with medium LLMs for task management and communication, and worker agents with refined small LLMs for patient interaction and operational tasks. The chatbot of the framework employs a self-evolving mechanism to adapt and improve system performance automatically when encountering new situations. The chatbot is accessible via multiple channels (e.g., phones, short message service (SMS) or other text messages, smart devices, etc.), thereby ensuring that it caters to various patient preferences without placing additional burden on healthcare teams' adaptability. The AI assistant of the framework may integrate with current healthcare workflows, thereby enabling an efficient, standardized, and auditable information collection system that enhances patient engagement without sacrificing professional accessibility. Further, the framework uses the LLMs for consistent optimization and tailoring of patient communications, and extracting clinically relevant insights for healthcare teams, while maintaining patient comfort and reducing anxiety during data collection. The framework includes a modular architecture that allows for updates and integration of new LLM models as they develop, thereby maintaining compatibility and performance improvements over time.

By analyzing data gathered from user interactions with a chatbot of the AI assistant, more effective techniques may be developed for collecting health information and diagnosing diseases, thereby surpassing the capabilities of traditional questionnaires. Utilizing A/B testing and other user experience optimization techniques, patient engagement and compliance may be boosted, ultimately transforming the healthcare experience into a more enjoyable one. The present invention embodiment provides advantages over everyday challenges of clinical studies. Drawing inspiration from the advantages of a microservice architecture over a monolithic system, the present invention embodiment incorporates a modular, hybrid LLM architecture. This architecture ensures forward compatibility and allows for replacement of existing components with new LLM models as they become available, thereby enhancing system performance without the need for costly retraining and realignment. This design consideration enhances the accessibility and affordability of the present invention embodiment, thereby expanding reach regardless of geography or resources.

An embodiment of the present invention provides an omnichannel artificial intelligence (AI) assistant to facilitate communication between patients and healthcare teams. The AI assistant provides several advantages. For example, the AI assistant simplifies patient engagement by translating complex medical surveys into casual conversations, thereby allowing patients to express their symptoms and concerns in their own words and native language without being restricted to multiple choices. If the patients do not understand the question, the chatbot of the AI assistant can provide clarification to make sure patient answers are relevant and accurate. The AI assistant uses natural language processing (NLP) and large language model (LLM) tools to analyze the free-form patient responses and infer the choices to convert the output into standard medical questionnaire format, which the care teams are already familiar with and can act on immediately without extra training.

The AI assistant further organizes all the collected information into concise charts and summaries for a medical team to review and audit, and alerts medical teams in case of emergencies. Through omnichannel integration, patients can talk to the chatbot via phone, short message service (SMS) or other text messages, smart devices, etc. Communication can happen at any time or location convenient for the patient. This integration ensures care for patients regardless of location, education, or familiarity with health terminology, and addresses universal accessibility, reducing health disparities, simplifying complex procedures, and supporting telehealth initiatives.

An embodiment of the present invention provides a method for facilitating communication between patients and healthcare teams. The method comprises engaging with patients through a conversational interface allowing free-form natural language input. A plural tier hierarchy of large language model (LLM) agents is utilized to process and interpret patient responses. The natural language patient input is translated into standard medical questionnaire formats for use by healthcare teams. The conversational interface may be accessible through various communication channels that include, but are not limited to, phone, short message service (SMS), smart devices, email, and social media platforms. The plural tier hierarchy of LLM agents may comprise large LLM leader agents responsible for auditing and high-importance reasoning tasks, medium LLM manager agents tasked with managing communication and assigning tasks, and small LLM worker agents specialized in patient interaction and operational actions. The plural tier hierarchy of LLM agents may be configured to audit and explain the data processing and summarization tasks, thereby ensuring accountability and transparency in the translation of patient input. In addition, the conversational interface and associated LLM agents may provide clarification and additional information to patients, thereby ensuring accurate and relevant healthcare documentation is collected.

The present invention embodiment may further comprise a self-evolving mechanism that monitors the performance of the LLM agents, detects misalignments and addresses new situations by implementing best-practice strategies, and documents and tests improvements to updating the best-practice strategies for continued learning and adaptation.

An embodiment of the present invention provides a system for facilitating patient-provider communication. The system comprises an omnichannel conversational interface for patient engagement, a multi-agent network framework comprising large language model (LLM) agents of various sizes and specializations or configurations, and a centralized or distributed computing resource capable of hosting, processing, and executing tasks assigned to the LLM agents. The conversational interface may employ natural language processing (NLP) and large language models (LLMs) for efficient translation and summarization of the natural language input into standardized health information. The multi-agent network framework may include a self-evolving mechanism to enhance system performance iteratively based on encountered events and interactions.

An embodiment of the present invention provides a non-transitory computer-readable medium containing instructions that, when executed by one or more processors, perform a method for processing patient communication with an AI assistant in healthcare. The method includes initiating and maintaining natural language conversations with patients. NLP and LLM-based analysis are applied to infer and summarize patient data into standardized formats. Interaction and communication models are continuously optimized based on aggregated data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as agent framework code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

An embodiment of the present invention provides a hybrid chatbot engine, and a fusion of hierarchical structures and decentralized swarm principles. Unlike conventional intra-model attention management and task distribution in Swarm Intelligent systems or Mixture of Expert (MoE) architecture, the present invention embodiment adopts an inter-model collaboration mechanism.

Figure 2:
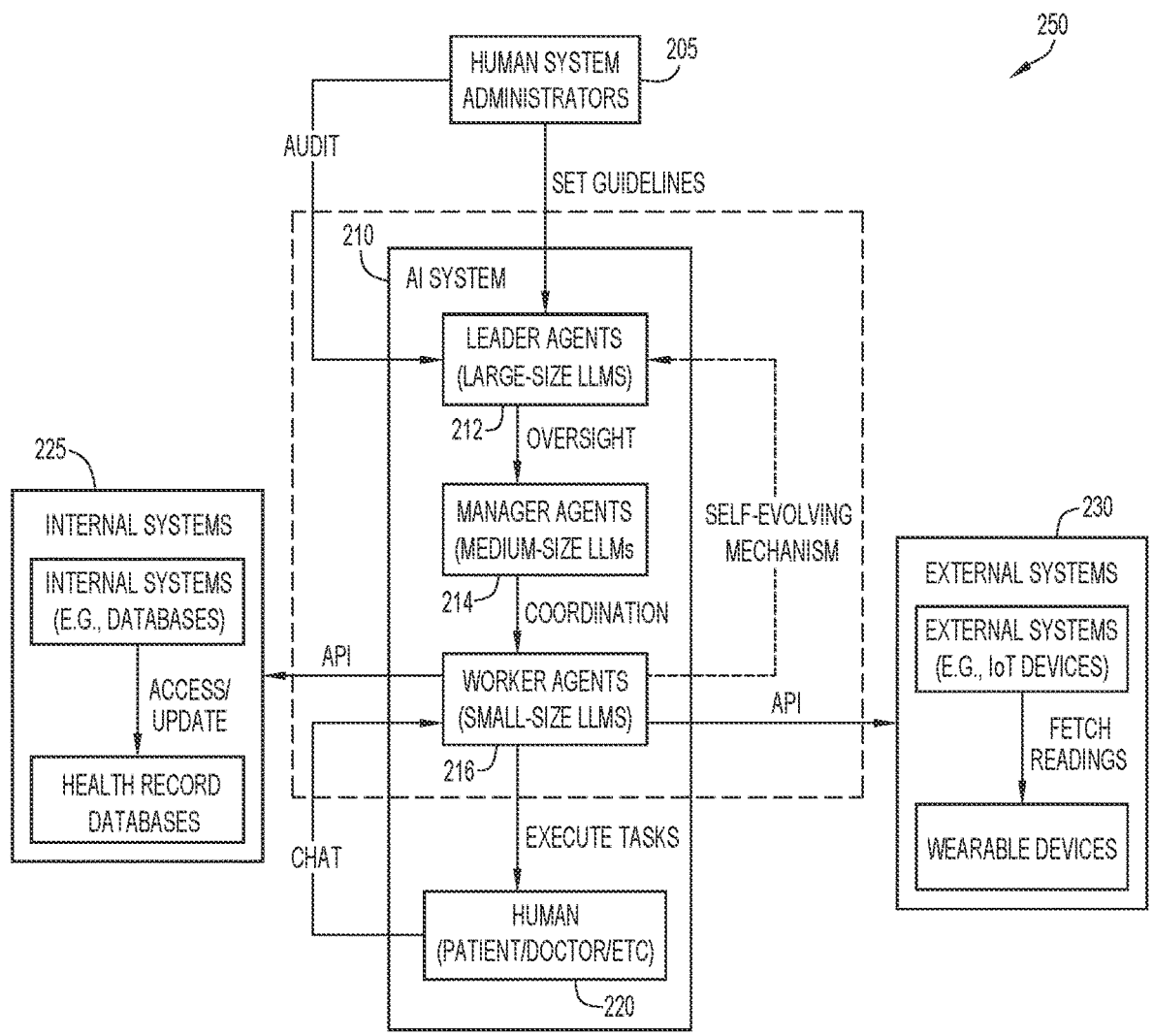
FIG. 2 is a system block diagram of an artificial intelligence (AI) framework according to an embodiment of the present invention.

An artificial intelligence (AI) framework 250 according to an embodiment of the present invention is illustrated in FIG. 2. Initially, framework 250 includes an artificial intelligence (AI) system 210 that receives information from system administrators 205 (e.g., via a computer system 103) and interacts with users 220 (e.g., patients, doctors or other health care providers, etc. via a computer system 103). AI system 210 may be implemented by agent framework code 200 and a computer 101. The AI system includes leader agents 212, manager agents 214, and worker agents 216. Leader agents 212 include large-sized large language models (LLMs) that are fine-tuned (or configured or trained) according to an assignment, and operate in collaboration with human system administrators 205 to oversee operations in accordance with set guidelines or principles (e.g., rules pertaining to data handling, storage, privacy, etc.). Their responsibility involves auditing system operations, ensuring behaviors align with set principles or guidelines, and conducting investigations as required. The leader agents run various functional councils, such as legal and compliance, supervised by a human system administrator 205.

Manager agents 214 include medium-sized large language models (LLMs) that are trained or configured to manage tasks, communicate with health care providers, assign jobs or tasks to worker agents 216, and oversee conversations between worker agents 216 and patients 220. The manager agents are responsible for data privacy, performance assessment, and reporting abnormal events or inconsistencies to leader agents 212.

Worker agents 216 include small-sized large language models (LLMs) that are fine-tuned (trained or configured) to be specialized with respect to jobs or tasks. The worker agents execute assigned tasks, such as empathetic patient interaction, appointment scheduling, insurance inquiries, and system operations (e.g., writing/querying databases, searching the Internet for updated information, etc.). This also includes interactions precisely personalized for a patient or language specialization. The worker agents may access (e.g., via corresponding application programming interfaces (APIs), etc.) internal systems 225 (e.g., internal databases, health record databases, etc.) and/or external systems 230 (e.g., Internet of Things (IoT) devices, wearable devices, etc.) to perform tasks or operations. Task complexity may necessitate deploying larger LLMs (e.g., medium or large-sized LLMs).

The leader, manager, and worker agents may employ any conventional or other Large Language Model (LLM) and natural language processing (NLP) techniques to perform tasks. The LLMs of the leader agents have a size greater than the size of the LLMs of the manager agents, while the LLMs of the manager agents have a size greater than the size of the LLMs of the worker agents. The size of the LLMs may be determined by various attributes. By way of example, the size of an LLM may be measured by the quantity of parameters for the LLM, where large-sized LLMs preferably have greater than fifty billion parameters, while small-sized LLMs preferably have less than ten billion parameters. Medium-sized LLMs preferably have a range of parameters between the small and large-sized LLMs (e.g., ten to fifty billion parameters, etc.).

These technologies can parse and understand text, extract key elements, such as parties involved, data types, jobs or tasks, and other relevant information. This information can be used to control tasks performed by the agents according to principles or guidelines. The LLMs may receive a prompt or natural language instruction, and process the prompt to extract and interpret the actions to be performed. The prompt may include several variations and forms.

The prompt language to utilize may be obtained by generating various candidate prompts and determining metrics based on the output of the Large Language Model (LLM) relative to desired or known results. The prompts or prompt language achieving greatest accuracy, performance, compliance, and/or other criteria may be used for the prompt provided to an LLM. In this way, prompts may be updated to adjust operation or behavior of the LLMs to improve performance or compliance, or to perform different tasks or behaviors. However, the agents may employ any quantity of any conventional or other machine learning and/or natural language processing (NLP) models (e.g., mathematical/statistical models, classifiers, feed-forward (fully or partially connected), recurrent (RNN), convolutional (CNN), or other neural networks, deep learning models, long short-term memory (LSTM), attention-based methods/transformers, Large Language Model (LLM), entity extraction, relationship extraction, part-of-speech (POS) taggers, semantic analysis, etc.).

In addition to the operations described above, framework 250 continuously monitors and enhances its performance. Leader agents 212 detect any misalignment between the behavior of worker agents 216 and/or manager agents 214 and the established principles or guidelines when addressing a new, previously unencountered situation. The leader agents document the event, draw from a list of best practices to rectify and refine the behavior, and conduct a test to verify the improvement. If successful, the process is documented in a best-practice or other list for future reference and human verification. Failure requires trying alternative strategies from the list. System administrator 205 may escalate the event for human intervention when all strategies prove ineffective.

The use of large language models (LLM) enables architecture 250 to work properly by providing enhanced resolution for mapping scenarios. For example, with respect to computer logic, binary limits judgements to True or False. Later, the computer logic had the ability to work with numbers providing a more detailed view (e.g., more than True or False). However, mapping real world situations into numbers is difficult, and computer systems were applicable for limited situations because of the complexity of real world situations.

Natural language (NL), on the other hand, has tremendous range and may describe virtually any scenario, thereby providing a more flexible way of presenting information. The large language models (LLMs) of framework 250 serve as an information processor for the framework. Since the human-AI agent communication happens in natural language (NL), the meta level information of this communication event may be obtained (e.g., how well the conversation goes, something went wrong (non-compliant), something went well, etc.). The logs for the communication events are also documented in natural language (NL) instead of a numerical score (e.g., 1-5, etc.). Manager agents 214 can directly process the natural language logs to provide assessments reports in natural language. Leader agents 212 can review the reports, make improvement decisions, and communicate with system administrators about the situation in natural language (NL). In other words, natural language (NL) is the carrier media (or information representation) of rich information that in the past was downward approximated to a numerical scale (e.g., 1-5, etc.) or even binary. Using large language models (LLMs)/natural language (NL) increases the resolution of describing real world situations.

Figure 3:
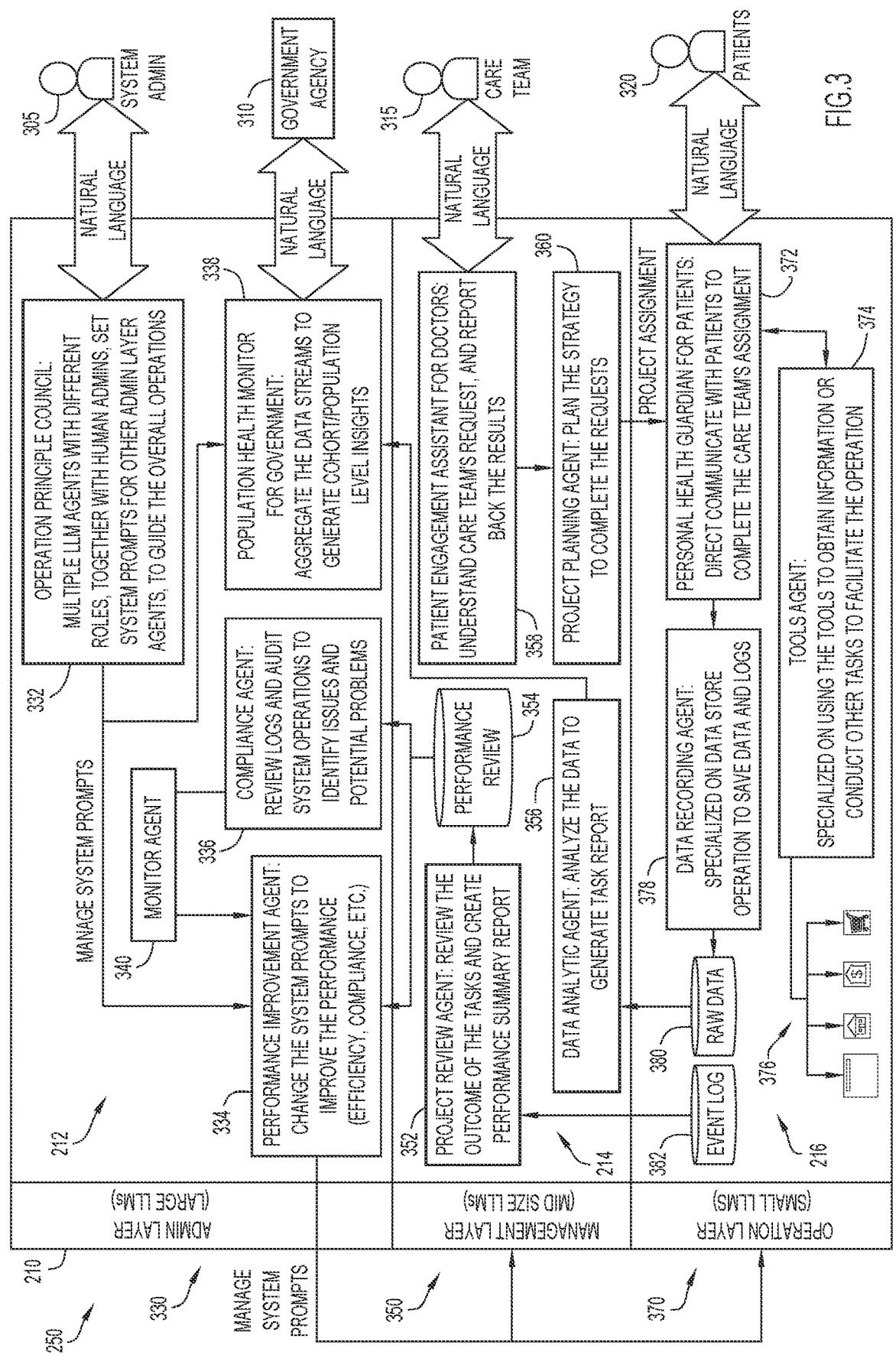
FIG. 3 is a flow diagram of an artificial intelligence (AI) system of the framework of FIG. 2 according to an embodiment of the present invention.

An artificial intelligence (AI) system 210 according to an embodiment of the present invention is illustrated in FIG. 3. Initially, AI system 210 of AI framework 250 includes a hierarchy of artificial intelligence (AI) or machine learning (ML) agents. By way of example, the hierarchy includes an administration layer or tier 330, a management layer or tier 350, and an operation layer or tier 370. However, the hierarchy may include any quantity of layers or tiers, each including any quantity of artificial intelligence (AI)/machine learning (ML) or other agents.

Administration layer 330 includes one or more artificial intelligence (AI) or machine learning (ML) leader agents 212 having large-sized large language models (LLMs) that operate in accordance with corresponding system prompts. The leader agents are fine-tuned (or trained or configured) according to a corresponding assignment or task, and operate in collaboration with human system administrators 305 to oversee operations in accordance with set guidelines or principles (e.g., rules pertaining to data handling, storage, privacy, etc.). Their responsibility involves auditing system operations, ensuring behaviors align with the set guidelines or principles, and conducting investigations as required. By way of example, leader agents 212 of administration layer 330 include operation principle councils 332, a performance improvement agent 334, a compliance agent 336, a population health monitor 338, and a monitor agent 340.

Leader agents 212 of administration layer 330 run various functional or operation principle councils 332, such as legal and compliance, supervised by a human system administrator 305. Operation principle councils 332 include multiple LLM agents with different roles, and together with human administrators 305 (e.g., via natural language input, etc.), set prompts for LLMs for other administration layer (or leader) agents to guide overall operations.

Performance improvement agent 334 may change the prompts set by operation principle councils 332 to improve performance (e.g., efficiency compliance, etc.) as described below based on logs and audit system operations. This information is obtained from performance reviews or reports 354 generated by a management agent 214 of management layer 350 (e.g., project review agent 352) as described below. The logs and/or performance reviews are in natural language (NL) (instead of a numerical score (e.g., 1-5, etc.)) providing greater resolution of system operation and behavior which are processed by one or more large-sized large language models (LLMs) of performance improvement agent 334.

Compliance agent 336 reviews logs and audit system operations to identify issues and potential problems (e.g., in accordance with the prompts set by operation principle councils 332). This information is obtained from performance reviews 354 generated by a management agent 214 of management layer 350 (e.g., project review agent 352) as described below. The logs and/or performance reviews are in natural language (NL) (instead of a numerical score (e.g., 1-5, etc.)) providing greater resolution of system operation and behavior which are processed by one or more large-sized large language models (LLMs) of compliance agent 336.

Population health monitor 338 aggregates data streams to generate cohort/population level insights (e.g., in accordance with the prompts set by operation principle councils 332). The insights may be provided to a government or other organization or agency 310 in response to a natural language request. The data streams may include task reports generated by a manager agent 214 of management layer 350 (e.g., data analytic agent 356) as described below.

Monitor agent 340 monitors agent operation to reduce non-compliance incidents and training iterations as described below (e.g., and in accordance with the prompts set by operation principle councils 332).

Management layer 350 includes one or more artificial intelligence (AI) or machine learning (ML) manager agents 214 having medium-sized large language models (LLMs) that operate in accordance with corresponding system prompts. The manager agents manage tasks, communicate with health care providers 315 to obtain a request for a project or work, assign jobs or tasks to worker agents 216 of operation layer 370 to perform the project or work, and oversee conversations between worker agents 216 of operation layer 370 and patients 320. The manager agents are responsible for data privacy, performance assessment, and reporting abnormal events or inconsistencies to leader agents 212 of administration layer 330. By way of example, manager agents 214 of management layer 350 include project review agent 352, data analytic agent 356, patient engagement assistant 358, and project planning agent 360.

Project review agent 352 reviews outcomes of tasks (by worker agents 216) and creates a performance summary report or review 354. The performance summary report may include any information (e.g., metrics, incidents, etc.) and be arranged in any format. The information analyzed is from an event log 382 created by the worker agents during performance of tasks. The event log is in natural language (instead of a numerical score (e.g., 1-5, etc.)) providing greater resolution of worker agent operation and behavior which is processed by one or more medium-sized large language models (LLMs) of project review agent 352. The performance summary report is in natural language and utilized by leader agents 212 of administration layer 330 (e.g., performance improvement agent 334 and compliance agent 336) to change prompts and identify issues as described above.

Data analytic agent 356 analyzes data to generate a task report. The data includes raw data 380 generated by a worker agent 216 of operation layer 370 (e.g., data recording agent 378) as described below. The task report may include any information (e.g., metrics, incidents, user feedback, etc.) and be arranged in any format. The raw data is processed by one or more medium-sized large language models (LLMs) of data analytic agent 356 to produce the task report in natural language (instead of a numerical score (e.g., 1-5, etc.)), thereby providing greater resolution of worker agent operation and behavior. The task report is utilized by a leader agent 212 of administration layer 330 (e.g., population health monitor 338) to generate insights as described above.

Patient engagement assistant 358 interacts with a care team 315. The patient engagement assistant understands a care team request (e.g., in natural language, etc.) for performance of a project or work and provides results for the request. Project planning agent 360 plans strategies (e.g., determines tasks to perform for the project or work and assignment of the tasks (e.g., and system prompts) for worker agents 216 of operation layer 370 to perform the project or work, etc.) to complete the care team requests (e.g., from patient engagement assistant 358). The task assignments (and system prompts) are provided to a worker agent 216 of operation layer 370 (e.g., personal health guardian 372) to process the requests and perform the projects or work in accordance with the strategies or task assignments (and system prompts) and return the results.

Operation layer 370 includes one or more artificial intelligence (AI) or machine learning (ML) worker agents 216 having small-sized large language models (LLMs) that operate in accordance with corresponding system prompts. The small-sized LLMs are fine-tuned (trained or configured) to be specialized with respect to a corresponding task. The worker agents execute assigned tasks, such as empathetic patient interaction, appointment scheduling, insurance inquiries, and system operations (e.g., writing/querying databases, searching the Internet for updated information, etc.). This also includes interactions precisely personalized for a patient or language specialization. By way of example, worker agents 216 of operation layer 370 may include personal health guardian 372, tools agent 374, and data recording agent 378.

Personal health guardian 372 communicates with patients 320 to perform the project or work from care team 315 (e.g., in accordance with the strategies and task assignments (and system prompts) received from project planning agent 360 of management layer 350 as described above). The personal health guardian may include a chatbot and receive natural language input from patients 320. The personal health guardian enables patients to converse naturally using their own words and native language (e.g., to report symptoms, concerns, or other matters). In an embodiment, the native language may be translated into a standardized medical questionnaire format which care teams 315 are already familiar with and can act on immediately without extra training. However, operation layer 370 may include agents (with chatbots) for translating the native language into formats (e.g., templates, documents, questionnaires, forms, etc.) for various scenarios (e.g., health care provider-patient communication, insurance-customer communication, mental health provider-patient communication, provider-patient family member communication, etc.).

Tools agent 374 is trained or configured (or specialized) for using tools 376 (e.g., data retrieval or searching, payment or other transactions, purchases, etc.) to obtain information or conduct other tasks to facilitate operation to process the request (based on system prompts from personal health guardian 372). The tools agent may utilize information from patient health guardian 372 (e.g., information from patients 320).

Data recording agent 378 is trained or configured (or specialized) for data store operation in order to save raw data 380 and event logs 382 (based on system prompts from personal health guardian 372). The event logs may be in natural language (instead of a numerical score (e.g., 1-5, etc.)) providing greater resolution of worker agent operation and behavior which is produced by one or more small-sized large language models (LLMs) of data recording agent 378. The raw data (e.g., questionnaire or other data from patient guardian agent 372) is used by a manager agent 214 of management layer 350 (e.g., data analytic agent 356) to generate a task report as described above. Event logs 382 include information for events recorded during performance of tasks (e.g., errors, compliance events, etc.) and are used by a manager agent 214 of management layer 350 (e.g., project review agent 352) to create a performance summary as described above.

By way of example, framework 250 may be used to optimize patient-provider communication within the healthcare sector. The framework addresses the issue of information asymmetry between patients and healthcare professionals and aims to deliver quality care more efficiently across all groups. The framework enables patients to converse naturally using their own words and native language to report symptoms and concerns, which the system translates into a standardized medical questionnaire format. However, framework 250 may translate the native language into formats (e.g., templates, documents, questionnaires, forms, etc.) for various scenarios (e.g., health care provider-patient communication, insurance-customer communication, mental health provider-patient communication, provider-patient family member communication, etc.).

In an example operation, a care team 315 interacts with patient engagement assistant 358 (e.g., via a computer system 103) to provide a request in a natural language for performance of a project or work (e.g., obtain medical information from patients according to a standardized medical questionnaire). Project planning agent 360 plans strategies (e.g., determines tasks to perform for the project or work and assignment of the tasks for worker agents 216 to perform the project or work, etc.) to complete the care team request (e.g., from patient engagement assistant 358).

Personal health guardian 372 communicates with patients 320 to perform the project or work from care team 315 (e.g., in accordance with the strategies and task assignments received from project planning agent 360). The personal health guardian may include a chatbot and receive natural language input from patients 320 using their own words and native language (e.g., to report symptoms, concerns, or other matters). The patients may communicate with the personal health guardian using various communication channels (e.g., a computer system 103, phone, short message service (SMS) or other text messages, smart devices, email, social media platforms, etc.). Tools agent 374 may obtain information from tools 376 based on information from patient health guardian 372 (e.g., information from patients 320). Results for the request (e.g., information translated to the medical questionnaire) are returned to patient engagement assistant 358 and provided to care team 315.

Framework 250 includes a self-evolving mechanism that continuously monitors and updates behaviors of the agents, detects misalignments and addresses new situations by implementing best-practice strategies, and documents and tests improvements to updating the best-practice strategies for continued learning and adaptation. For example, patient health guardian 372 provides information to data recording agent 378 to store event logs 382 as described above. The event logs are used by project review agent 352 to generate performance review reports 354 as described above. These reports are used by performance improvement agent 334 and compliance agent 336 to adjust behaviors of worker agents 216 to improve performance and compliance of the agents as described below (FIGS. 4A-4B and 5A-5B). By way of example, the behavior of the worker agents may be adjusted by adjusting prompts for large language models (LLMs) of those agents as described below. In addition, worker and leader agents may be continuously monitored and updated by monitor agent 340 to reduce non-compliance incidents and reduce training iterations as described below (FIG. 6). Thus, the agents may be continuously updated (e.g., for each new request, as events are logged, as agents are updated, etc.).

Figure 4A:
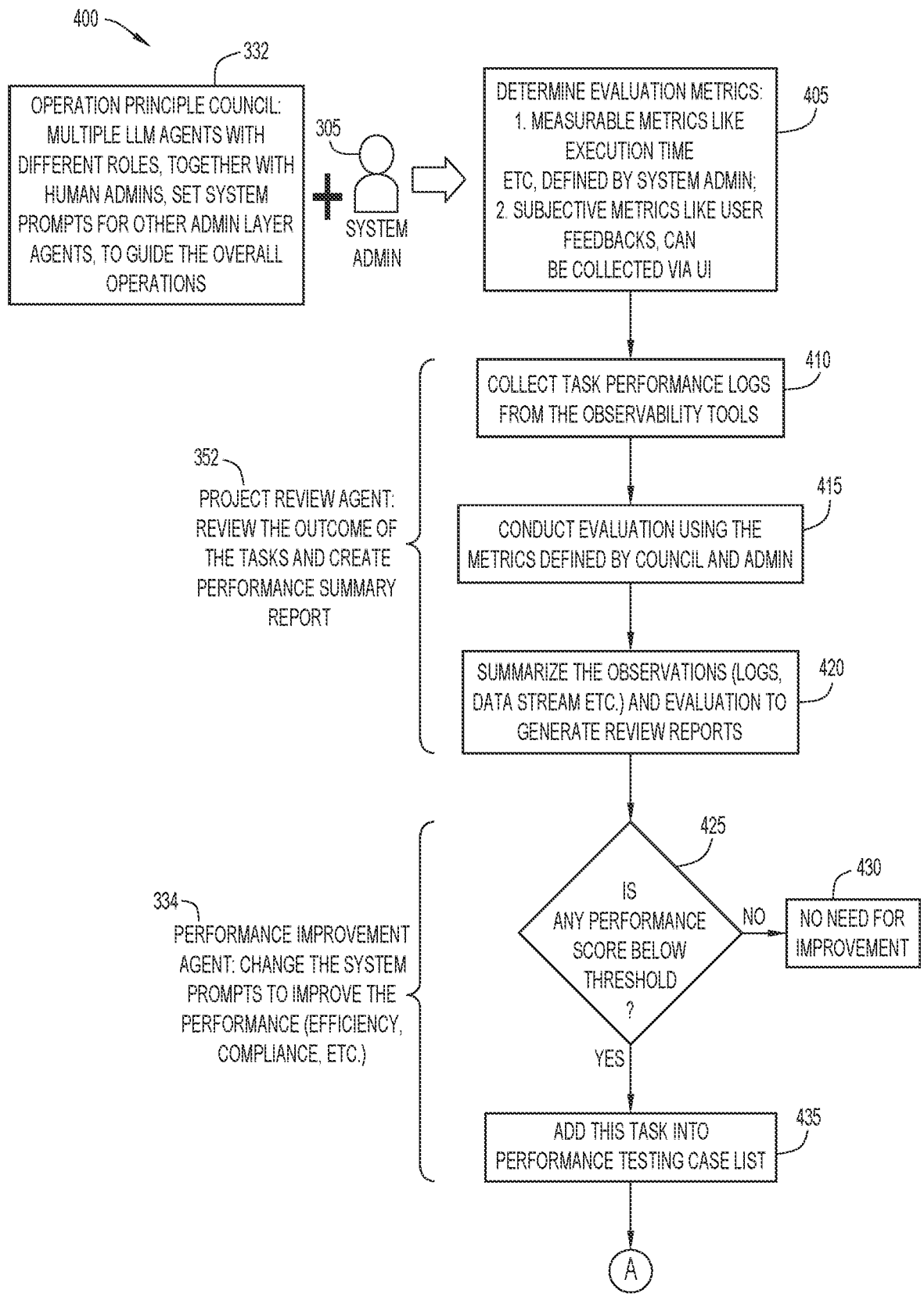
FIGS. 4A-4B are a procedural flowchart of a manner of updating a worker agent for performance according to an embodiment of the present invention.
Figure 4B:
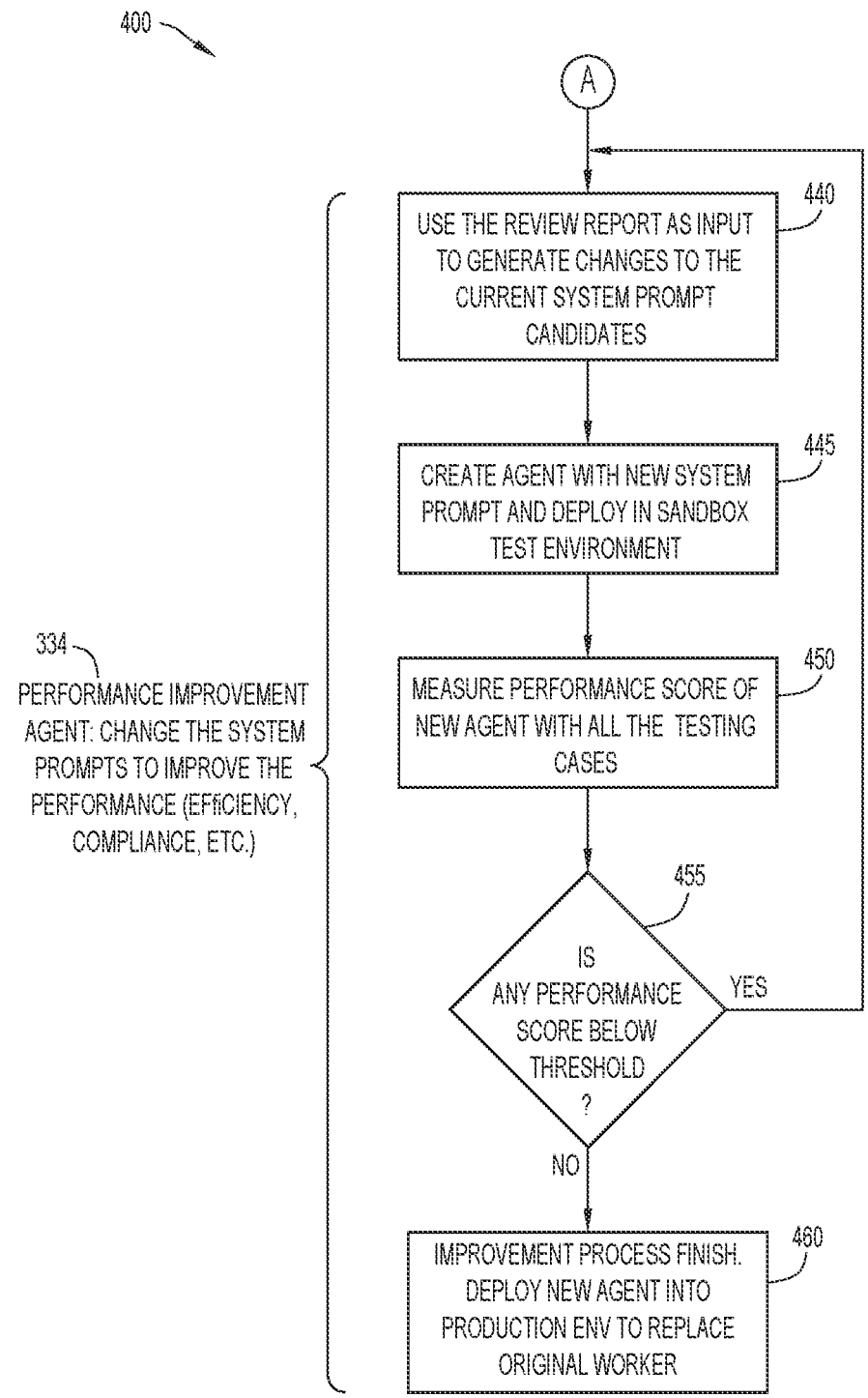

A method 400 of updating a worker agent for performance according to an embodiment of the present invention is illustrated in FIGS. 4A-4B. By way of example, leader agents 212 of administration layer 330 (e.g., performance improvement agent 334, etc.) and manager agents 214 of management layer 350 (e.g., project review agent 352) may update a worker agent 216 of operation layer 370 (e.g., personal health guardian 372, tools agent 374, etc.). However, any leader, management, worker, and/or other agents may be used to update any other agent in substantially the same manner described below.

Initially, leader agents 212 of administration layer 330 run various functional or operation principle councils 332, such as legal and compliance, supervised by a human system administrator 305. Operation principle councils 332 include multiple LLM agents with different roles, and together with human administrators 305 (e.g., via natural language input, etc.), set prompts for LLMs for other administration layer (or leader) agents to guide overall operations in substantially the same manner described above. The operation principle councils 332 (and system administrator 305) also determine evaluation metrics for updating a worker agent 216 (e.g., personal health guardian 372, tools agent 374, etc.) at operation 405. By way of example, the metrics include measurable performance metrics (e.g., execution time and other metrics defined by system administrator 305, etc.) and/or subjective performance metrics (e.g., user feedback which may be collected via a user interface, etc.).

Project review agent 352 of management layer 350 reviews the outcome of tasks and creates a performance summary report 354. For example, the project review agent collects task performance logs from event logs 382 at operation 410. The event logs may be based on observability tools 376 (and tools agent 374). The project review agent evaluates the logs at operation 415 using the measurable and/or subjective performance metrics defined by operation principle council 332 and system administrator 305 described above. By way of example, the project review agent may extract relevant information from the logs corresponding to the performance metrics, and determine satisfaction of the performance metrics with respect to performance thresholds (e.g., indicating acceptable or unacceptable levels of performance, etc.).

Project review agent 352 summarizes the observations (e.g., event logs 382, data streams, etc.) and evaluation at operation 420 to generate performance review reports 354. The performance review reports may include any information arranged in any fashion (e.g., metrics values, performance threshold values for satisfactory performance, indications of satisfaction of the measurable and/or subjective performance thresholds, etc.).

Once the performance review reports are generated, performance improvement agent 334 of administration layer 330 changes or updates system prompts (e.g., natural language instructions for the large language models (LLMs) of agents, etc.) to improve performance of the worker agent (e.g., improve efficiency, etc.). The performance improvement agent examines performance scores (or metrics) in performance reports 354 at operation 425. When all performance scores (or metrics) satisfy (e.g., exceed, meet or exceed, etc.) a corresponding performance threshold (e.g., the worker agent performance is acceptable, no update is required and the process terminates at operation 430.

When at least one performance score (or metric) fails to satisfy (e.g., is less than or below, etc.) a corresponding performance threshold (e.g., the worker agent performance is deficient), performance improvement agent 334 adds the task corresponding to the metrics to a performance testing case or other list at operation 435. The performance improvement agent performs one or more training iterations. For example, the performance improvement agent generates changes to current system prompt candidates (e.g., determined by operation principle councils 332) for the worker agent (and task) at operation 440 (FIG. 4B) using performance review report 354 as input. By way of example, the large language model (LLM) of the performance improvement agent may receive the current prompt and performance review report 354 and produce changes (or a modified prompt). Further, the system prompt may be modified using any conventional or other genetic algorithm and/or differential evolution algorithm.

Performance improvement agent 334 creates a new or updated worker agent 216 (e.g., personal health guardian 372, tools agent 374, etc.) with a new system prompt, and deploys the agent in a sandbox or other isolated test environment at operation 445. Performance scores (or metrics) of the new or updated worker agent are measured with all the testing cases of the list to produce performance review reports 354 at operation 450 in substantially the same manner described above. The performance improvement agent compares the performance scores (or metrics) to the corresponding performance thresholds.

When all performance scores (or metrics) of the testing cases satisfy (e.g., exceed, meet or exceed, etc.) corresponding performance thresholds as determined at operation 455 (e.g., the new worker agent performance is acceptable), performance improvement agent 334 deploys the new or updated worker agent 216 (e.g., personal health guardian 372, tools agent 374, etc.) into a production environment to replace the current worker agent at operation 460.

When at least one performance score (or metric) fails to satisfy (e.g., is less than or below, etc.) a corresponding performance threshold as determined at operation 455 (e.g., the new worker agent performance is deficient), the process repeats from operation 440 as described above to perform another training iteration to change system prompts until the performance scores (or metrics) satisfy the performance thresholds (or, for example, a timeout or a maximum number of training iterations has occurred) and the new or updated worker agent (e.g., personal health guardian 372, tools agent 374, etc.) is deployed.

Figure 5A:
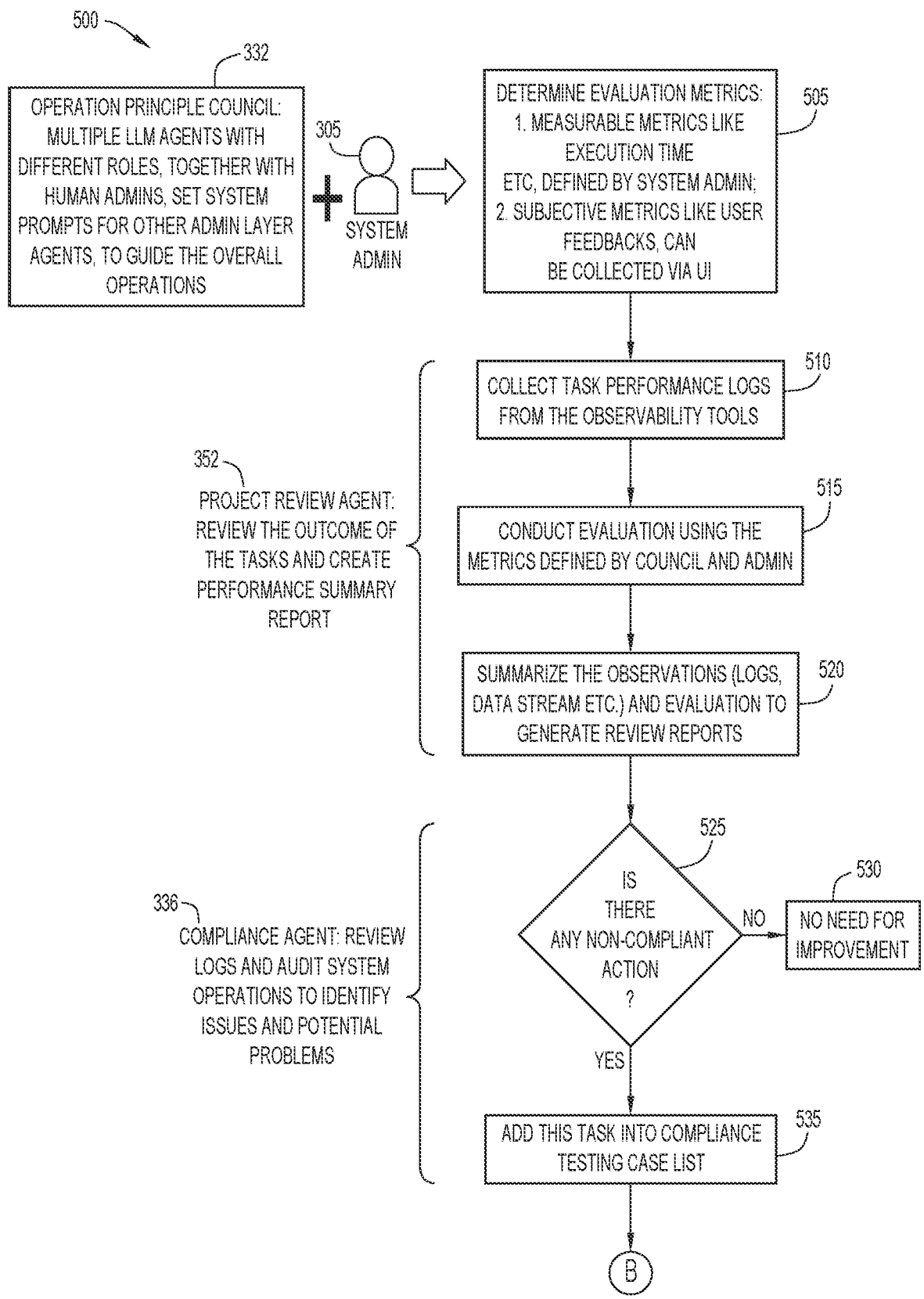
FIGS. 5A-5B are a procedural flowchart of a manner of updating a worker agent for compliance according to an embodiment of the present invention.
Figure 5B:
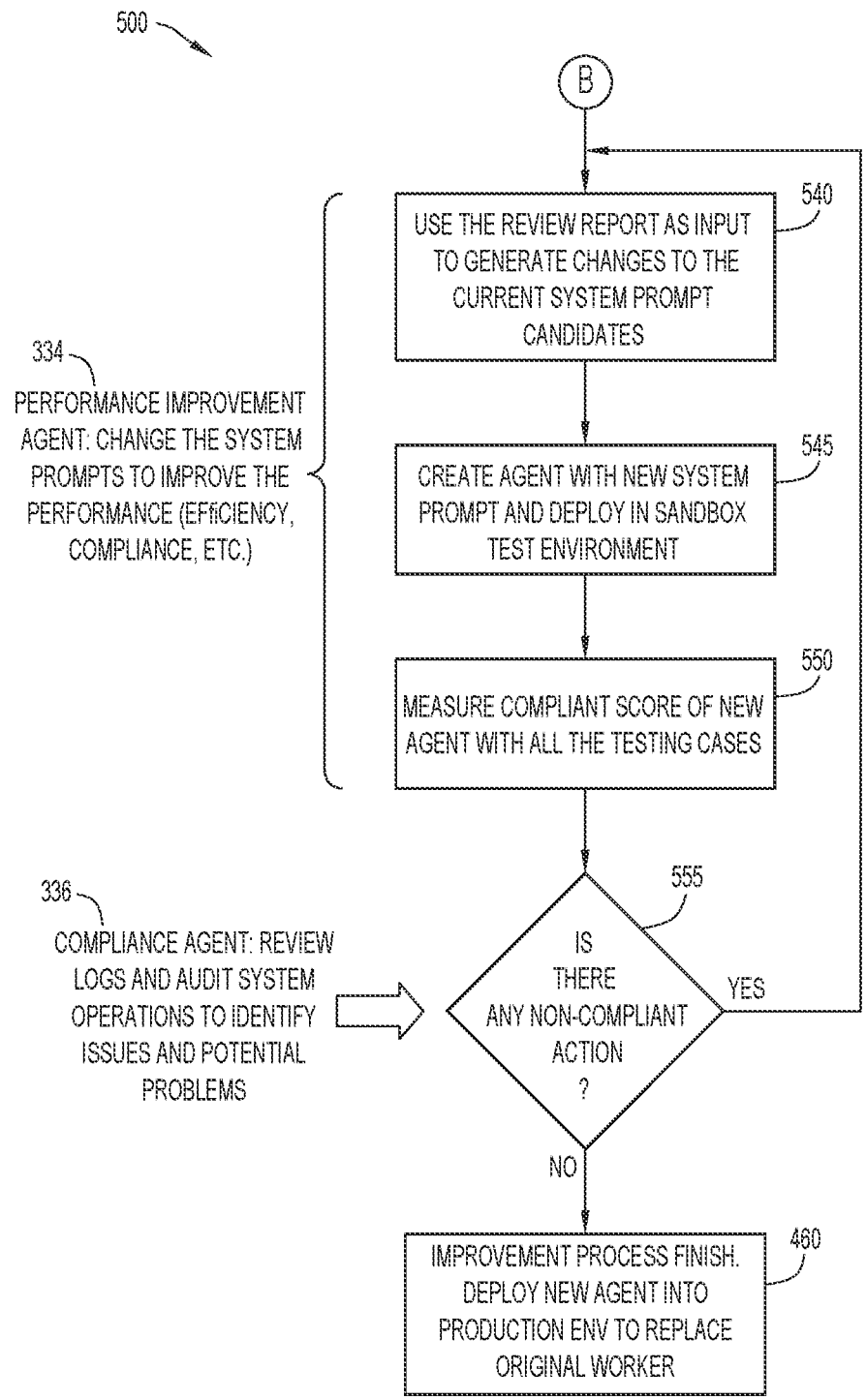
Figure 6:
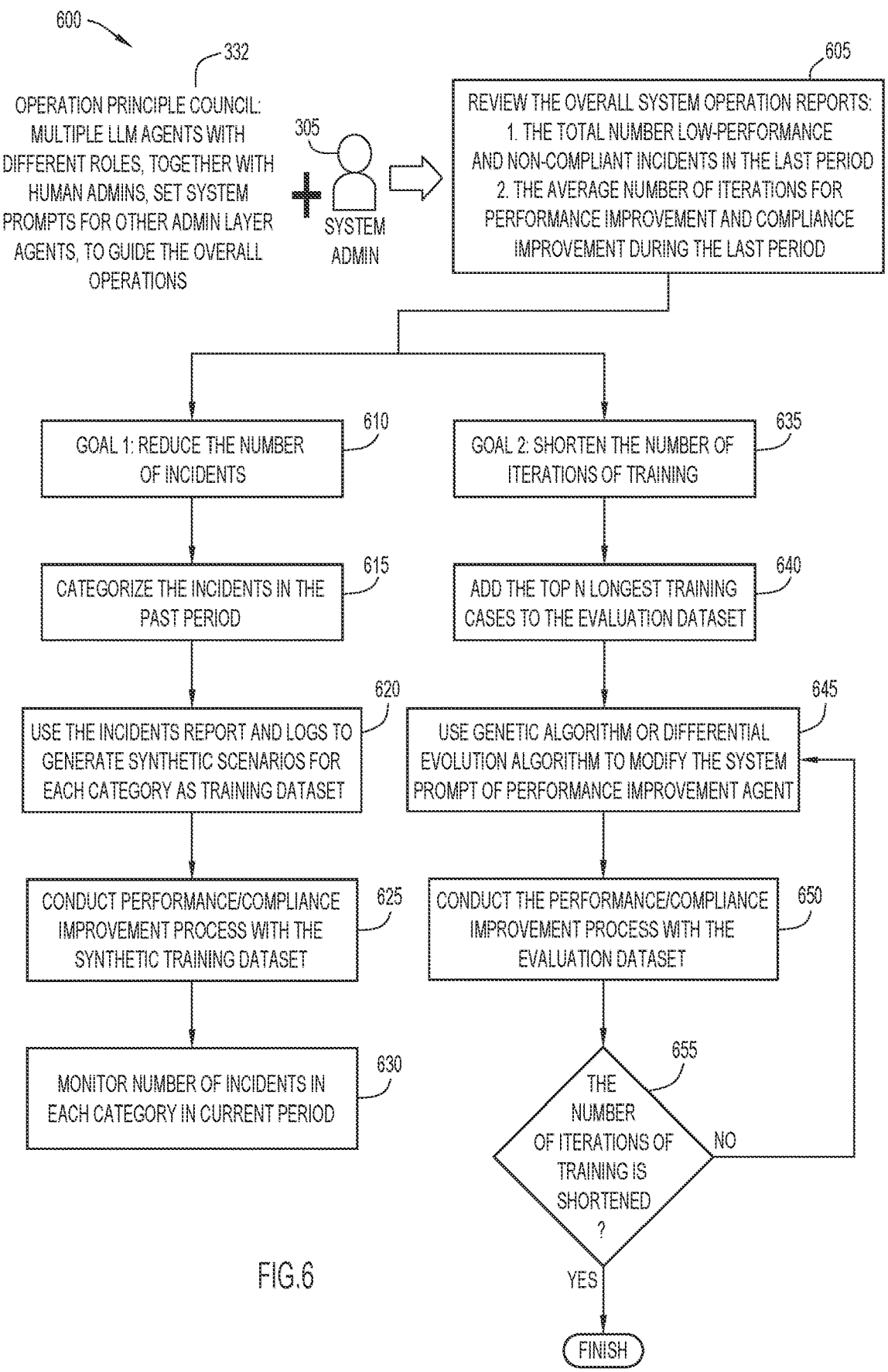
FIG. 6 is a procedural flowchart of a manner of reducing training iterations and non-compliance incidents according to an embodiment of the present invention.

A method 500 of updating a worker agent for compliance (e.g., with guidelines, etc.) according to an embodiment of the present invention is illustrated in FIGS. 5A-5B. By way of example, leader agents 212 of administration layer 330 (e.g., performance improvement agent 334, compliance agent 336, etc.) and manager agents 214 of management layer 350 (e.g., project review agent 352, etc.) may update a worker agent 216 of operation layer 370 (e.g., personal health guardian 372, tools agent 374, etc.). However, any leader, management, worker, and/or other agents may be used to update any other agent in substantially the same manner described below.

Initially, leader agents 212 of administration layer 330 run various functional or operation principle councils 332, such as legal and compliance, supervised by a human system administrator 305. Operation principle councils 332 include multiple LLM agents with different roles, and together with human administrators 305 (e.g., via natural language input, etc.), set prompts for LLMs for other administration layer (or leader) agents to guide overall operations in substantially the same manner described above. The operation principle councils 332 (and system administrator 305) also determine evaluation metrics for updating a worker agent 216 (e.g., personal health guardian 372, tools agent 374, etc.) at operation 505. By way of example, the metrics include measurable compliance metrics (e.g., execution time and other metrics defined by system administrator 305, etc.) and/or subjective compliance metrics (e.g., user feedback which may be collected via a user interface, etc.).

Project review agent 352 of management layer 350 reviews the outcome of tasks and creates a performance summary report 354. For example, the project review agent collects task performance logs from event logs 382 at operation 510. The event logs may be based on observability tools 376 (and tools agent 374). The project review agent evaluates the logs at operation 515 using the measurable and/or subjective compliance metrics defined by operation principle council 332 and system administrator 305 described above. By way of example, the project review agent may extract relevant information from the logs corresponding to the compliance metrics, and determine satisfaction of the compliance metrics with respect to compliance thresholds (e.g., indicating acceptable or unacceptable levels of compliance with guidelines or principles, etc.).

Project review agent 352 summarizes the observations (e.g., event logs 382, data streams, etc.) and evaluation at operation 520 to generate performance review reports 354. The performance review reports may include any information arranged in any fashion (e.g., metrics values, compliance threshold values for satisfactory compliance, indications of satisfaction of the measurable and/or subjective compliance thresholds, etc.).

Once the performance review reports are generated, compliance agent 336 of administration layer 330 reviews the logs and audit system operations to identify issues and potential problems. The compliance agent examines compliance scores (or metrics) in performance reports 354 at operation 525. When all compliance scores (or metrics) satisfy (e.g., exceed, meet or exceed, etc.) a corresponding compliance threshold (e.g., the worker agent is compliant), no update is required and the process terminates at operation 530.

When at least one compliance score (or metric) fails to satisfy (e.g., is less than or below, etc.) a corresponding compliance threshold (e.g., the worker agent is non-compliant), compliance agent 336 adds the task corresponding to the metrics to a compliance testing case or other list at operation 535. The performance improvement agent performs one or more training iterations. For example, the performance improvement agent generates changes to current system prompt candidates (e.g., determined by operation principle councils 332) for the worker agent (and task) at operation 540 (FIG. 5B) using performance review report 354 as input. For example, the large language model (LLM) of the performance improvement agent may receive the current prompt and performance review report 354 and produce changes (or a modified prompt). Further, the system prompt may be modified using any conventional or other genetic algorithm and/or differential evolution algorithm.

Performance improvement agent 334 creates a new or updated worker agent 216 (e.g., personal health guardian 372, tools agent 374, etc.) with a new system prompt, and deploys the agent in a sandbox or other isolated test environment at operation 545. Compliance scores (or metrics) of the new or updated worker agent are measured with all the compliance testing cases of the list to produce performance review reports 354 (with compliance scores or metrics) at operation 550 in substantially the same manner described above. The performance improvement agent compares the compliance scores (or metrics) to the corresponding compliance thresholds.

When all compliance scores (or metrics) of the testing cases satisfy (e.g., exceed, meet or exceed, etc.) corresponding compliance thresholds as determined by compliance agent 336 at operation 555 (e.g., the new worker agent is compliant), the compliance agent deploys the new or updated worker agent 216 (e.g., personal health guardian 372, tools agent 374, etc.) into a production environment to replace the current worker agent at operation 560.

When at least one compliance score (or metric) fails to satisfy (e.g., is less than or below, etc.) a corresponding compliance threshold as determined at operation 555 (e.g., the worker agent is non-compliant), the process repeats from operation 540 as described above to perform another training iteration to change system prompts until the compliance scores (or metrics) satisfy the compliance thresholds (or, for example, a timeout or a maximum number of training iterations has occurred) and the new or updated worker agent (e.g., personal health guardian 372, tools agent 374, etc.) is deployed.

A method 600 of reducing training iterations and non-compliance incidents according to an embodiment of the present invention is illustrated in FIG. 6. By way of example, leader agents 212 of administration layer 330 (e.g., performance improvement agent 334, compliance agent 336, monitor agent 340, etc.) and manager agents 214 of management layer 350 (e.g., project review agent 352, etc.) may be used to update other agents to reduce non-compliance incidents and/or training iterations. However, any leader, management, worker, and/or other agents may be used to update any other agent in substantially the same manner described below.

Initially, leader agents 212 of administration layer 330 run various functional or operation principle councils 332, such as legal and compliance, supervised by a human system administrator 305. Operation principle councils 332 include multiple LLM agents with different roles, and together with human administrators 305 (e.g., via natural language input, etc.), set prompts for LLMs for other administration layer (or leader) agents to guide overall operations in substantially the same manner described above. The operation principle councils 332 (and system administrator 305) also review overall system operation reports and determine incident and training iteration information at operation 605. By way of example, the information may include a total number of low-performance and non-compliant incidents in a last time period (e.g., minutes, hours, days, weeks, months, etc.) and an average number of iterations for performance improvement and compliance improvement during the last time period.

Monitor agent 340 may initiate reduction of the number of non-compliance incidents at operation 610. The monitor agent determines and categorizes the number of non-compliance incidents in a past time period (e.g., one or more minutes, hours, days, weeks, months, etc.) at operation 615 (e.g., based on event logs 382). The categories may be based on any criteria (e.g., severity, particular principle or guideline violated, etc.). Incident reports and logs (e.g., in event log 382) are used to generate scenarios for each category as a training dataset at operation 620.

The training dataset of scenarios is used to update the worker agents 216 (or system prompts) to improve performance/compliance at operation 625 in substantially the same manner described above (e.g., FIGS. 4A-4B and 5A-5B). The monitor agent monitors the number of non-compliance incidents for each category in a current time period based on the training at operation 630. The process may be repeated periodically or based on a number of non-compliance incidents in a time period to reduce or maintain the number of non-compliance incidents at or below a threshold number of non-compliance incidents.

Monitor agent 340 may initiate shortening of a number of training iterations (e.g., for adjusting system prompts for agents, etc.) at operation 635. The monitor agent may add the top N (e.g., N>1, etc.) longest training cases or scenarios to an evaluation dataset at operation 640. The longest training cases may be based on any desired attributes (e.g., number of training iterations, execution time, size/complexity of tasks, etc.). The monitor agent modifies a system prompt for performance improvement agent 334 at operation 645. The system prompt may be modified using any conventional or other genetic algorithm and/or differential evolution algorithm.

The evaluation dataset is used to update the worker agents 216 (or system prompts) to improve performance/compliance at operation 650 in substantially the same manner described above (e.g., FIGS. 4A-4B and 5A-5B). For example, the training cases may be executed to monitor the worker agents and adjust the system prompts accordingly. The monitor agent monitors the number of training iterations (for adjusting the system prompts) at operation 655. When the number of training iterations is reduced (e.g., relative to a number of training iterations of a prior time period, etc.), the process terminates.

When the number of training iterations is not reduced (e.g., relative to a number of training iterations of a prior time period, etc.), the process is repeated from operation 645 to modify performance improvement agent 334 (or system prompt) until the number of training iterations is reduced. The above process may be repeated periodically or based on a number of training iterations to reduce or maintain the number of training iterations at or below a threshold number of training iterations.

It will be appreciated that the embodiments described above and illustrated in the drawings represent only a few of the many ways of implementing embodiments for an artificial intelligence (AI) multi-agent framework.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., agent framework code 200, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., questionnaires, requests, results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., questionnaires, requests, results, etc.).

The present invention embodiments are not limited to the specific tasks or algorithms described above, but may be utilized for communicating in a natural language with various entities and performing tasks for various scenarios based on natural language requests.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing requests to perform projects comprising:
   processing a request in a natural language to perform a project via a hierarchy of machine learning agents of at least one processor, wherein one or more machine learning agents of a management layer of the hierarchy determine and assign tasks for the project to one or more machine learning agents of an operation layer of the hierarchy based on the request;
   performing the assigned tasks by the one or more machine learning agents of the operation layer to perform the project;
   monitoring operation of the machine learning agents of the operation layer by one or more machine learning agents of an administration layer of the hierarchy; and
   adjusting behavior of the machine learning agents of the operation layer by the one or more machine learning agents of the administration layer to reduce one or more from a group of non-compliance incidents and training iterations, wherein the adjusting the behavior of the machine learning agents comprises shortening a number of training iterations and adding a plurality of longest training cases to an evaluation dataset used by the monitoring operation.

2. The method of claim 1, further comprising:
   monitoring operation of the machine learning agents of the operation layer by one or more machine learning agents of an administration layer of the hierarchy; and
   adjusting behavior of the machine learning agents of the operation layer by the one or more machine learning agents of the administration layer in response to one or more from a group of deficient performance and non-compliance with guidelines.

3. The method of claim 2,
   wherein the machine learning agents of the administration layer, the management layer, and the operation layer include large language models and the monitoring is based on natural language reports.

4. The method of claim 3,
   wherein adjusting behavior of the machine learning agents of the operation layer comprises:
      adjusting prompts for the large language models of the operation layer.

5. The method of claim 3,
   wherein the machine learning agents of the administration layer include large-sized large language models, the machine learning agents of the management layer include medium-sized large language models, and the machine learning agents of the operation layer include small-sized large language models.

6. The method of claim 1, further comprising:
   interacting with health care providers in the natural language, via at least one machine learning agent of the management layer, to receive the request; and
   interacting with patients in the natural language to obtain information and translating the information obtained from the patients into a medical questionnaire to perform the project via at least one machine learning agent of the operation layer.

7. The method of claim 6,
   wherein the patients interact with the at least one machine learning agent of the operation layer via one or more from a group of phone, text messages, smart devices, email, and social media platforms.

8. The method of claim 1, wherein the plurality of the longest training cases are identified based on one or more of a number of training iterations, an execution time, size of the assigned tasks, and complexity of the assigned tasks.

9. A system for processing requests to perform projects comprising:
   one or more processors; and
   one or more memory devices coupled to the one or more processors, wherein the one or more processors are configured to:
      process a request in a natural language to perform a project via a hierarchy of machine learning agents, wherein one or more machine learning agents of a management layer of the hierarchy determine and assign tasks for the project to one or more machine learning agents of an operation layer of the hierarchy based on the request;
      perform the assigned tasks by the one or more machine learning agents of the operation layer to perform the project;
      monitor operation of the machine learning agents of the operation layer by one or more machine learning agents of an administration layer of the hierarchy; and
      adjust behavior of the machine learning agents of the operation layer by the one or more machine learning agents of the administration layer to reduce one or more from a group of non-compliance incidents and training iterations,
      wherein the one or more processors, to adjust the behavior of the machine learning agents, are further configured to shorten a number of training iterations and add a plurality of longest training cases to an evaluation dataset used by the monitoring operation.

10. The system of claim 9,
    wherein the one or more processors are further configured to:
       monitor operation of the machine learning agents of the operation layer by one or more machine learning agents of an administration layer of the hierarchy; and
       adjust behavior of the machine learning agents of the operation layer by the one or more machine learning agents of the administration layer in response to one or more from a group of deficient performance and non-compliance with guidelines.

11. The system of claim 10,
    wherein the machine learning agents of the administration layer, the management layer, and the operation layer include large language models and the monitoring is based on natural language reports.

12. The system of claim 11,
    wherein the one or more processors, to adjust the behavior of the machine learning agents of the operation layer, are further configured to:
       adjust prompts for the large language models of the operation layer.

13. The system of claim 11,
    wherein the machine learning agents of the administration layer include large-sized large language models, the machine learning agents of the management layer include medium-sized large language models, and the machine learning agents of the operation layer include small-sized large language models.

14. The system of claim 9,
wherein the one or more processors are further configured to:
    interact with health care providers in the natural language, via at least one machine learning agent of the management layer, to receive the request; and
    interact with patients in the natural language to obtain information and translate the information obtained from the patients into a medical questionnaire to perform the project via at least one machine learning agent of the operation layer.

15. The system of claim 14,
wherein the patients interact with the at least one machine learning agent of the operation layer via one or more from a group of phone, text messages, smart devices, email, and social media platforms.

16. The system of claim 9, wherein the plurality of the longest training cases are identified based on one or more of a number of training iterations, an execution time, size of the assigned tasks, and complexity of the assigned tasks.

17. A non-transitory computer-readable medium storing a set of instructions for wireless communication, the set of instructions comprising:
    one or more instructions that, when executed by one or more processors of a device, cause the device to:
    process a request in a natural language to perform a project via a hierarchy of machine learning agents, wherein one or more machine learning agents of a management layer of the hierarchy determine and assign tasks for the project to one or more machine learning agents of an operation layer of the hierarchy based on the request;
    perform the assigned tasks by the one or more machine learning agents of the operation layer to perform the project;
    monitor operation of the machine learning agents of the operation layer by one or more machine learning agents of an administration layer of the hierarchy; and
    adjust behavior of the machine learning agents of the operation layer by the one or more machine learning agents of the administration layer to reduce one or more from a group of non-compliance incidents and training iterations,
    wherein the one or more instructions, to adjust the behavior of the machine learning agents, cause the device to shorten a number of training iterations and add a plurality of longest training cases to an evaluation dataset used by the monitoring operation.

18. The non-transitory computer-readable medium of claim 17,
wherein the one or more instructions cause the device to:
    monitor operation of the machine learning agents of the operation layer by one or more machine learning agents of an administration layer of the hierarchy; and
    adjust behavior of the machine learning agents of the operation layer by the one or more machine learning agents of the administration layer in response to one or more from a group of deficient performance and non-compliance with guidelines.

19. The non-transitory computer-readable medium of claim 18,
wherein the machine learning agents of the administration layer, management layer, and the operation layer include large language models and the monitoring is based on natural language reports.

20. The non-transitory computer-readable medium of claim 19,
wherein the one or more instructions, to adjust the behavior of the machine learning agents of the operation layer, cause the device to:
    adjust prompts for the large language models of the operation layer.

21. The non-transitory computer-readable medium of claim 19,
wherein the machine learning agents of the administration layer include large-sized large language models, the machine learning agents of the management layer include medium-sized large language models, and the machine learning agents of the operation layer include small-sized large language models.

22. The non-transitory computer-readable medium of claim 17,
wherein the one or more instructions cause the device to:
    interact with health care providers in the natural language, via at least one machine learning agent of the management layer, to receive the request; and
    interact with patients in the natural language to obtain information and translate the information obtained from the patients into a medical questionnaire to perform the project via at least one machine learning agent of the operation layer.

23. The non-transitory computer-readable medium of claim 22,
wherein the patients interact with the at least one machine learning agent of the operation layer via one or more from a group of phone, text messages, smart devices, email, and social media platforms.

24. The non-transitory computer-readable medium of claim 17, wherein the plurality of the longest training cases are identified based on one or more of a number of training iterations, an execution time, size of the assigned tasks, and complexity of the assigned tasks.

* * * * *